United States Patent [19]

Penner

[11] 4,084,151
[45] Apr. 11, 1978

[54] SYSTEM FOR RECORDING AND PROCESSING SEISMIC REFLECTION SIGNALS

[75] Inventor: Wayne A. Penner, Carrollton, Tex.

[73] Assignee: Mobil Oil Corporation, New York, N.Y.

[21] Appl. No.: 742,927

[22] Filed: Nov. 18, 1976

Related U.S. Application Data

[63] Continuation-in-part of Ser. No. 572,471, Apr. 28, 1975, Pat. No. 4,016,531.

[51] Int. Cl.$^2$ .................................................. G01V 1/24
[52] U.S. Cl. ........................ 340/15.5 DP; 340/15.5 GC; 360/6
[58] Field of Search ............... 340/15.5 DP, 15.5 GC, 340/174 LC; 360/5, 6, 39; 235/176, 154

[56] References Cited

U.S. PATENT DOCUMENTS

| | | | |
|---|---|---|---|
| 3,562,504 | 2/1971 | Harris | 340/15.5 GC |
| 3,699,325 | 10/1972 | Montgomery et al. | 235/154 |
| 3,895,342 | 7/1975 | Mallett et al. | 340/15.5 DP |
| 4,021,772 | 5/1977 | Cook et al. | 340/15.5 DP |
| 4,040,002 | 8/1977 | Durand | 340/15.5 DP |

*Primary Examiner*—Nelson Moskowitz
*Attorney, Agent, or Firm*—C. A. Huggett; George W. Hager, Jr.

[57] ABSTRACT

A seismic recording system employs amplifiers, a multiplexer, and an analog-to-digital converter for converting analog seismic reflection signals obtained during seismic exploration operations to a serial output of multiplexed digital samples. An input controller restores to the digital samples the original amplitude of the seismic signals as they were received by the field recorder and scales the digital samples for later compositing into a seismic record in a central processing unit. An output controller then applies to each digital sample in the composite record a desired gain prior to recording on a magnetic tape unit.

9 Claims, 5 Drawing Figures

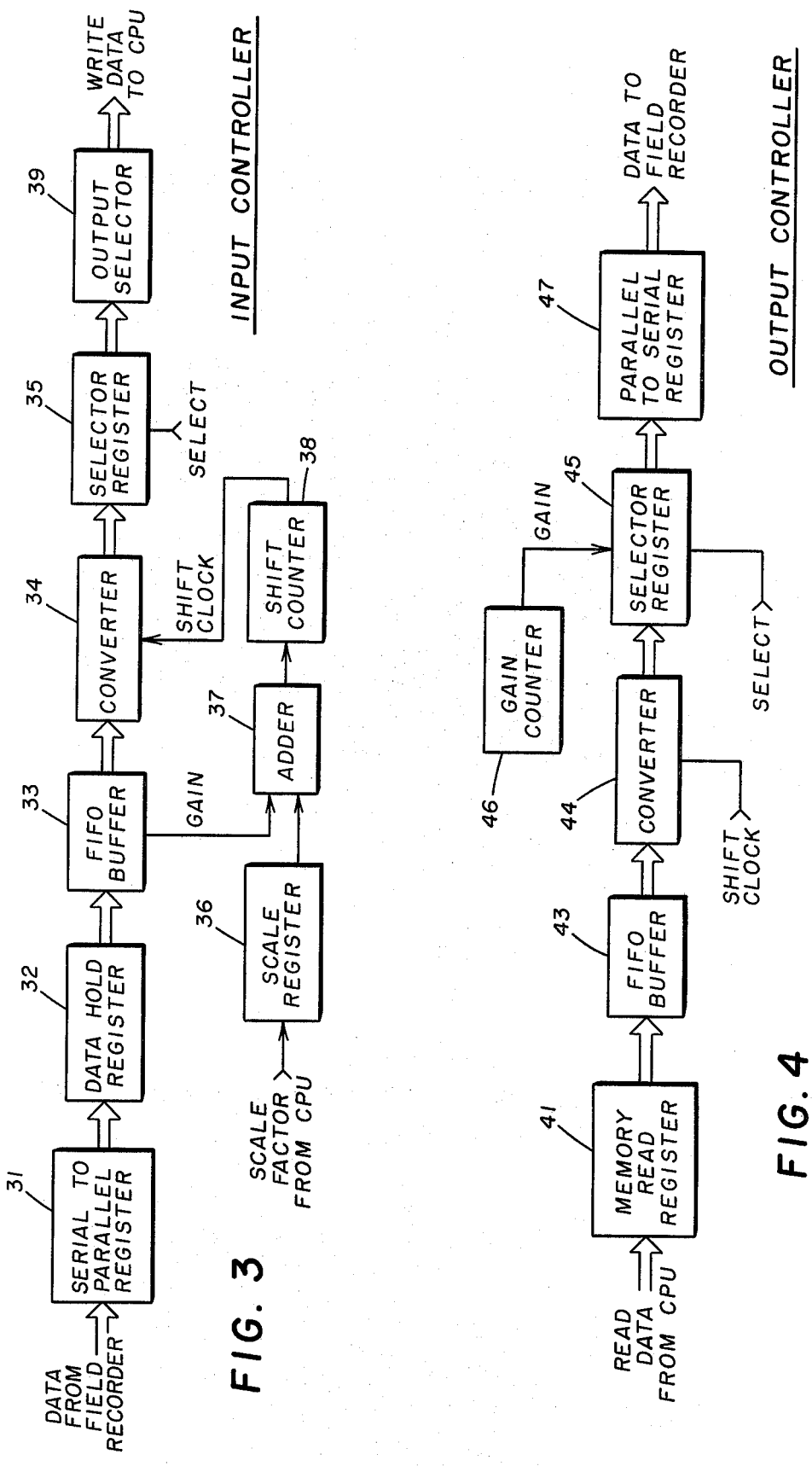

ADDRESS CONTROLLER

SYSTEM FOR RECORDING AND PROCESSING SEISMIC REFLECTION SIGNALS

CROSS-REFERENCE TO RELATED APPLICATION

This is a continuation-in-part of copending United States patent application Ser. No. 572,471, filed Apr. 28, 1975, now U.S. Pat. No. 4,016,531.

BACKGROUND OF THE INVENTION

This invention relates to seismic exploration and more particularly to a system for recording and processing a plurality of seismic reflection signals in a plurality of recording channels.

In seismic exploration, it has been found desirable to employ a plurality of seismic energy detectors to generate electrical signals in response to the reception of acoustic reflections from subsurface interfaces caused by the generation of acoustic pressure waves from one or more seismic energy sources. These seismic energy detectors are connected to a seismic recording system having a plurality of recording channels, the output of each detector being applied to one of the recording channels. It has become conventional practice in digital field recording systems to amplify the seismic signal on each recording channel and then sequentially and repeatedly sample through each of the recording channels to produce a serial output of multiplexed samples of the plurality of seismic signals. These multiplexed samples are then digitized and conventionally recorded on magnetic tape for further data processing.

SUMMARY OF THE INVENTION

The present invention is directed toward a seismic exploration system for recording and processing a plurality of seismic reflection signals. In a seismic exploration system, seismic reflection signals are received by seismic detectors and then amplified and converted into a plurality of digital samples in a field recorder.

In accordance with the present invention, the amplification applied to the seismic signals in the recorder is removed from each of the digital samples and the digital samples are scaled by a desired factor prior to being stacked into a composite seismic record. More particularly, a plurality of gain bits are generated representing the units of amplification applied to the seismic signals in the recorder. A plurality of scale bits are generated representing the desired scale factor to be applied to the digital samples. The combined count represented by these gain bits and scale bits is identified and each digital sample is shifted by the number of bit positions represented by such combined count. Corresponding digital samples for a plurality of seismic signals are then stacked to produce a composite record. The digital samples of the composite record are then shifted by the number of bit positions necessary to impart a desired gain to the composite record prior to its being transmitted to the recorder for reproduction on magnetic tape.

BRIEF DESCRIPTION OF THE DRAWINGS

FIGS. 3-5 illustrate in block diagram form the I/O controller portion of the seismic data processing system of FIG. 1.

DESCRIPTION OF THE PREFERRED EMBODIMENT

Figure 1:
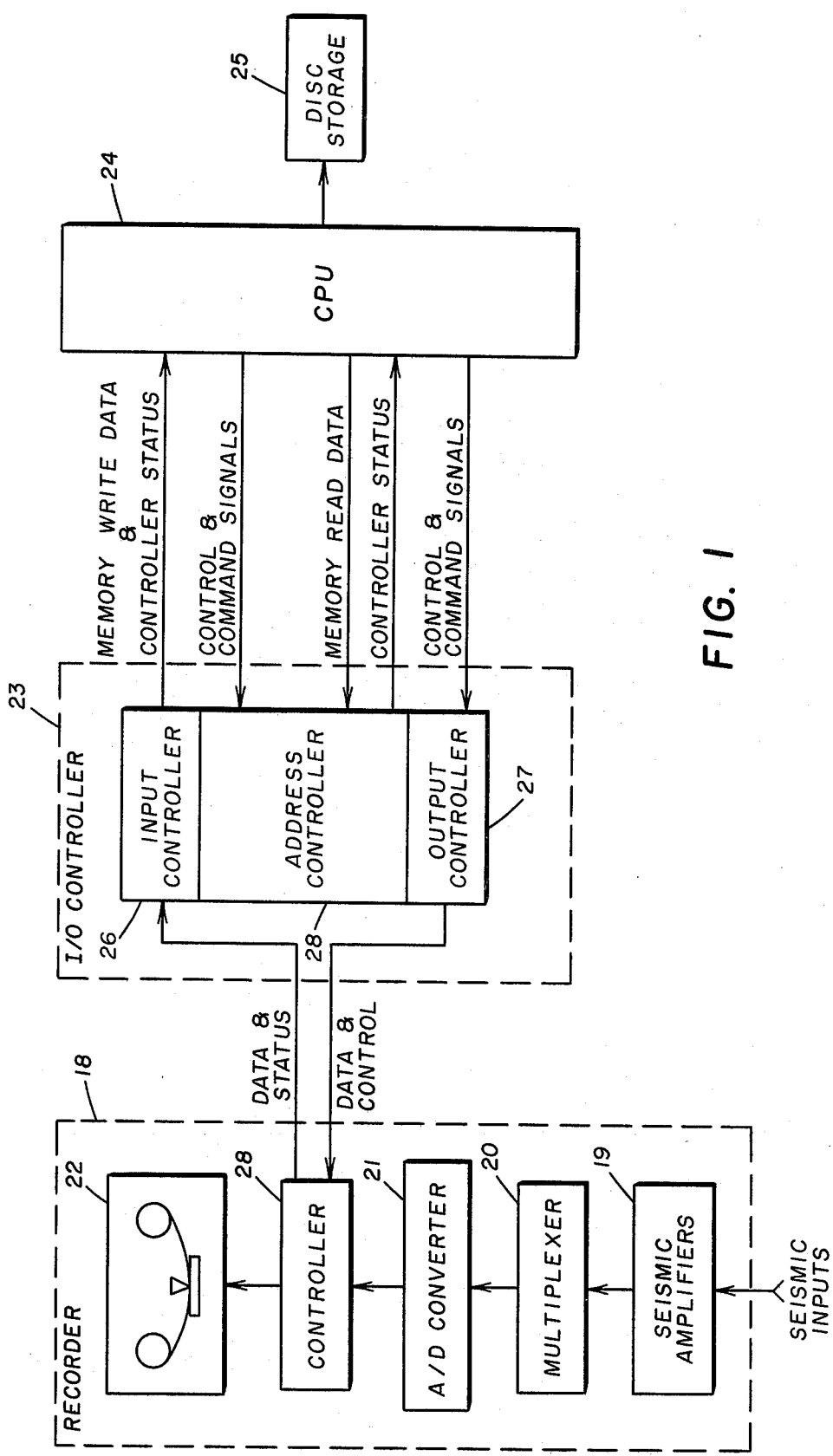
FIG. 1 depicts a seismic recorder and data processing system embodying the present invention.

Illustrated in FIG. 1 is a seismic recorder and processing system employed in carrying out the present invention.

Seismic reflection signals generated by seismic energy from detectors during a seismic exploration operation are applied to a seismic field recorder 18. The recording of the seismic signals by the field recorder 18 is conventionally carried out by means of seismic amplifiers 19, multiplexer 20, analog-digital converter 21, controller 28, and magnetic tape transport 22. In such a field recorder, the seismic analog reflection signal from each detector is applied to a separate recording channel and amplified by the seismic amplifer in that channel. The multiplexer 20 rapidly switches sequentially from the first to the last of the recording channels and applies the samples at the outputs of the respective seismic amplifiers through the analog-digital converter 21 and the controller 28 to the magnetic tape transport 22 for recording. One such conventional field recorder is the Texas Instruments Model DFS V digital field recorder.

Figure 2:
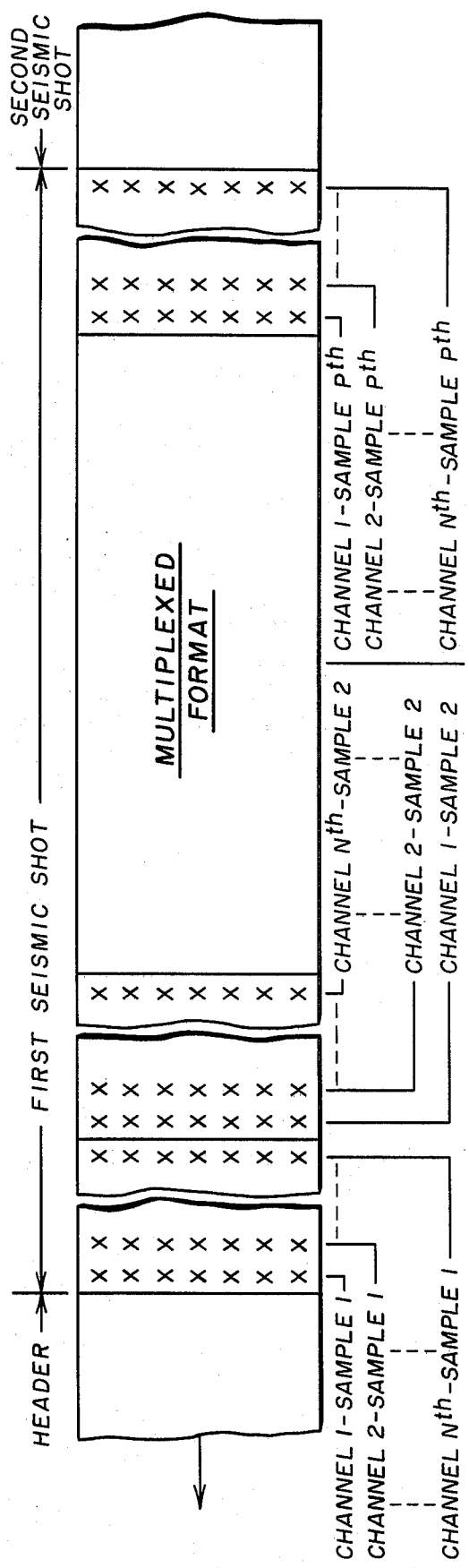
FIG. 2 illustrates a particular data recording format for the seismic recorder of FIG. 1.
Figure 5:
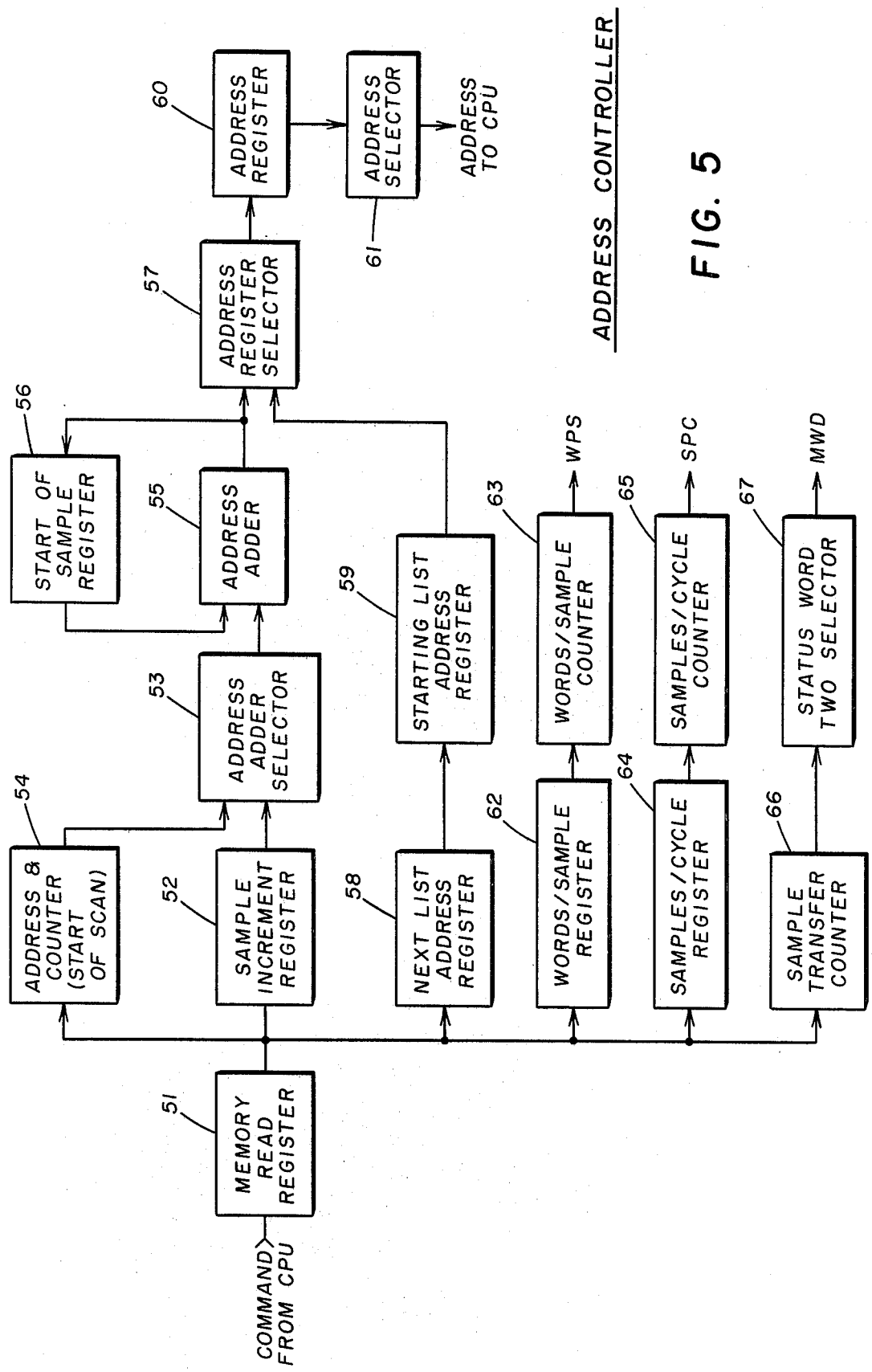

A single byte of digital bits (X's) is shown as being recorded across the magnetic tape for each digital sample. Following the first seismic shot, the multiplexer 20 rapidly switches sequentially from the first to the last of the seismic recording channels to obtain these samples (i.e., CHANNEL 1 — SAMPLE 1 through CHANNEL N — SAMPLE 1). The second set of samples (i.e., CHANNEL 1 — SAMPLE 2 through CHANNEL N — SAMPLE 2) is obtained from a second sequential switching of multiplexer 20 across the seismic recording channels. After the last of the set of samples (i.e., SAMPLE P) has been recorded for each seismic channel, a second seismic shot is produced and the resulting seismic signals recorded in similar manner. Accordingly, it can be seen that the digital samples representing the received seismic reflection signals are conventionally recorded in a multiplexed digital format. Although a single byte of digital bits is shown in FIG. 2 for each sample, any number of bytes may conventionally be employed. Further, although seven digital bits are shown in FIG. 2 for each sample, any number of bits may be conventionally employed as is necessary to record data and gain information. In addition, a block bit, a clock bit, a parity bit, and a sign bit may also be recorded.

In the processing of a seismic record made by the foregoing-described conventional seismic exploration system, the digital samples transmitted to and from the recorder 18 are not of the original amplitude of the seismic reflection signals. It is, therefore, a specific feature of the present invention to provide a method and system by which the digital samples received from the recorder can be converted to the original amplitudes for compositing in the central processing unit. It is a further feature of the present invention to selectively scale the digital samples prior to compositing in the central processing unit.

In carrying out the present invention, there is provided the input/output (I/O) controller 23 and the central processor unit (CPU) 24. In the preferred embodiment, the CPU 24 comprises a Texas Instruments Model 980 B Computer (24K memory) including the following peripheral control equipment: I/O expansion chassis and disc controller. The I/O controller 23 is illustrated in schematic form in FIG. 1 as being comprised of an input controller 26, an output controller 27, and an address controller 28. Each of these units 26–28 will now be described in detail.

INPUT CONTROLLER (FIG. 3)

Seismic data to the input controller 26 is the multiplexed, digital samples of the seismic reflection signals from the field recorder 18. This data represents the magnitudes of the amplified seismic reflection signals and the units of amplification (i.e., gain) applied to these seismic reflection signals by the seismic amplifiers 19 in the field recorder 18. Status information indicating the mode of operation of the recorder (i.e., record of reproduce) may also be applied to the input controller 26.

The seismic data is applied serially in 19-bit digital form (3 gain bits and 16 data bits) to the serial-to-parallel register along with 12 other bits, some identifying recorder status information. After each of these bits has been serially shifted into the register 31, they are strobed in parallel into the data hold register 32. From register 32, the data is strobed into the first-in-first-out (FIFO) buffer 33. As soon as the first data word is loaded into the buffer 33, it is strobed out to the converter 34. Converter 34 functions to remove the gain applied to the seismic reflection signals by the field recorder 18 and provide a binary number representing the true amplitudes of the seismic reflection signals as received by the field recorder 18. Converter 34 also functions to scale each of the seismic reflection signals prior to stacking during data processing operations in the CPU 24. The function of the FIFO buffer 33 is to apply each data word to the converter 34 only after the converter 34 has completed the conversion of the previous data word and transferred it to CPU 24 memory. Should this conversion and transfer rate be slower than the rate at which the data words are being supplied by the serial-to-parallel register 31 and the data hold register 32, the FIFO buffer 33 will accumulate each word in buffer storage to be strobed out at the conversion rate of the converter 34.

The gain removal and scaling functions carried out by the converter 34 are under the control of the scale register 36, the 4-bit adder 37, and the shift control 38. A desired scale factor word from the CPU 24 is applied by way of the scale register 36 to one input of the adder 37. For example, if 16 seismic records are to be conventionally stacked to produce a full-scale composite record, each record must be scaled down to 1/16 of full scale. In digital-bit recording, each bit is shifted one bit position for a ½ scale down. Therefore, for stacking of 16 seismic records, the digital bits each need to be shifted by four bit positions.

Also applied to adder 37 are three gain bits from the buffer 33 identifying the gain applied to the seismic reflection signals being applied from the buffer 33 to the converter 34. Adder 37 adds the scale factor word and the three gain bits to provide a summation signal to the shift counter 38, identifying the number of bit position shifts of the converter 34 necessary to carry out the gain removal and scaling functions. Shift counter 38 provides shift clock pulses to the converter 34 in response to the summation signal and terminates these shift clock pulses when it has counted the summation signal down to zero. At this point, the data word in the converter 34 has been shifted down one bit position for each shift clock pulse that has been generated, and the position in the converter of the data word now represents the seismic reflection signal as received from the seismic energy detectors and further scaled for a desired stacking in the CPU 24.

Data from the converter 34 is next applied to the selector register 35 which functions as a switch to select for passing to the outlet selector 39 the data as it entered the converter 34 prior to gain removal and scaling or as it appears in the converter 34 after such gain removal and scaling. The selected data is then applied as two data words to the output selector 39. This is carried out in the preferred embodiment to divide the 31-bit data word of the field recorder into 16-bit data words so as to be compatible with the CPU 24. The output selector 39 then selectively applies each data word to the CPU 24.

In the preferred embodiment, serial-to-parallel register 31 comprises a plurality of Texas Instruments type SN74164; data hold register 32 comprises a plurality of Texas Instruments type SN74174; buffer 33 comprises a plurality of Texas Instruments type SN7489; converter 34 comprises a plurality of Texas Instruments type 74198; selector register 35 comprises a plurality of Texas Instruments type SN74298; scale register 36 is a Texas Instruments type SN74175; 4-bit adder 37 is a Texas Instruments type SN74283; shift counter 38 comprises a plurality of Texas Instruments type SN74163 counters and a plurality of Texas Instruments type SN7400 series gates; and output selector 38 comprises a plurality of Texas Instruments type SN74258.

OUTPUT CONTROLLER (FIG. 4)

Seismic data from the CPU 24 is applied to the output controller 27. This data, representing the seismic reflection signals as conventionally stacked by the CPU 24, is applied through the memory read register 41 to the FIFO buffer 43. As soon as the first data word is loaded into the FIFO buffer 43, it is strobed out to the converter 44. Converter 44 applies a desired gain to the data. FIFO buffer 43 applies each data word to the converter 44 only after the converter 44 has completed the conversion of the prevoius data word. Should this conversion rate be slower than the rate at which the data words are being supplied by the memory read register 41, the FIFO buffer 43 will accumulate each word in buffer storage to be strobed out at the conversion rate of the converter 44. Converter 44 applies gain to the seismic data by shifting each data word one bit position at a time until one of three conditions is met: (1) The number of shifts reaches 14 before either of the other conditions is met; (2) The number of shifts is an even number and the second most significant bit is different from the sign bit; and (3) The number of shifts is an even number and the most significant bit is different from the sign bit. The gain counter 46 counts each bit position shift of the converter 44 to provide a gain signal representative of the amount of gain applied to the seismic data by the converter 44.

Data from the converter 44 is next applied to the selector register 45 along with the gain signal from the gain counter 46. Selector register 45 functions as a switch to select for passing to the parallel-to-serial register 47 the data as it entered the converter 44 or as it output from the converter 44. The parallel-to-serial register 47 then passes the data and its gain from selector register 45 to the field recorder 18 serially in digital-bit form. Each sample of data for each seismic channel comprises 18 digital bits representing the amplified seismic reflection signals and the units of amplification applied to the data by the converter 44.

In the preferred embodiment, memory read register 41 comprises a plurality of Texas Instruments type SN74175; FIFO buffer 43 comprises a plurality of Texas Instruments type SN7489; converter 44 comprises a plurality of Texas Instruments type SN74198; selector register 45 comprises a plurality of Texas Instruments SN74298; gain counter 46 is a Texas Instruments type SN74193; and parallel-to-serial register 47 comprises a plurality of Texas Instruments type SN74166.

ADDRESS CONTROL (FIG. 5)

Seismic data is written into CPU 24 memory by the input controller 26 and read out of CPU 24 memory by the output controller 27 under control of the address controller 28. The address controller 28 has two modes of operation: normal sequential addressing and nonsequential addressing.

In normal sequential addressing, the CPU 24 sends the starting location address to the memory read register 51. The location address is then loaded into the start of scan register 54. The start of sample register 56 is cleared to zero and the address adder selector 53 is enabled to select the output of the start of scan register 54. The input to the address adder 55 is now made up of the output of the start of sample register 56, which is zero, and the output of the address adder selector 53, which has selected the output of the start of scan register 54. This places the location address on the output of the address adder 55. The address register input selector 57 is then enabled to select the output of the address adder 55 and place the location address on the input of the address register. The location address is then loaded into the address register 60 which is thereafter incremented by one every time a 16-bit word is read/written out of or into the CPU 24 memory by output controller 27 or input controller 26, respectively.

In the nonsequential addressing mode, CPU 24 sends the starting location address to the memory read register 51. The starting location address is then loaded into the start or scan register 54. The CPU 24 then sends the words/sample and samples/cycle information to the memory read register 51. The words/samples register 62 and the samples/cycle register 64 are then loaded with 6 bits and 10 bits, respectively, of the output of the memory read register 51. The output of the words/sample register 62 and the output of the samples/cycle register 64 are then loaded into the words/sample counter 63 and sample/cycle counter 65, respectively. The CPU 24 then sends the sample increment information to the memory read register 51. The output of the start of scan register 54 is selected by address adder selector 53, and the start of sample register 56 is cleared to zero with the address register input selector 57 enabled to select the output of the address adder 55. The start of sample register 56 and the address register 60 are then loaded with the starting location address originally sent by the CPU 24, and the sample increment register 52 is loaded with the output of the memory read register 51. The registers and counters in the address controller 28 are now initialized.

When the first 16-bit computer word is transferred to or from CPU 24 memory, the address register 60, the start of scan register 54, and the words/sample counter 63 are incremented. If the words/sample counter 63 is all "1's", the samples/cycle counter 65 is incremented, the words/sample counter 63 is loaded with the output of the words/sample register 62, the output of the sample increment register 52 is applied to the input of the address adder 55 by the address adder selector 53, and the sum of the sample increment register 52 and the start of sample register 56 are loaded into the address register 60 through address register input selector 57 which is set up to select the output of address adder 55. The start of sample register 56 is also loaded at this time with the output of address adder 55. The address control 28 is now initialized for the next sample.

After the samples/cycle counter 65 is incremented at the end of each sample, a check is made of the samples/cycle counter 65. If the samples/cycle counter 65 contains all "1's", it is reloaded with the output of the samples/cycle register 64. The start of sample register 56 is cleared to zero and the address register 60 is loaded with the contents of the start of scan register 54 through address adder selector 53, address adder 55, and address register input selector 57. The start of sample register 56 is also loaded with the contents of the start of scan register 54. The address controller 28 is now initialized for a new scan.

I claim:

1. A method of processing seismic reflection signals, comprising the steps of:
    (a) recording a plurality of seismic reflection signals in a plurality of recording channels,
    (b) amplifying the seismic reflection signals in each recording channel by a given number of units of amplification,
    (c) converting each amplified seismic signal into a plurality of digital samples,
    (d) producing a first signal representing the number of units of amplification applied to the seismic reflection signals, said first signal being represented by a plurality of digital bits,
    (e) producing a second signal representing a desired scale factor to be applied to the seismic reflection signals, said second signal being represented by a plurality of digital bits,
    (f) producing a third signal identifying the combined count represented by the digital bits of said first and second signals, and
    (g) shifting said digital samples by the number of bit positions represented by said third signal.

2. The method of claim 1 wherein the step of shifting said digital samples comprises the steps of:
    (a) producing a plurality of clock pulses equal in number to the bit positions represented by said third signal,
    (b) applying said digital samples to at least one shift register, and
    (c) shifting each digital sample one bit position along said shift register in response to each of said plurality of clock pulses.

3. The method of claim 1 further including the step of combining the shifted digital samples for a selected number of said seismic signals to produce a composite record.

4. The method of claim 3 further including the step of shifting the digital samples of said composite record by the number of bit positions necessary to impart a desired gain to said composite record prior to recording.

5. The method of claim 3 wherein said selected number of seismic signals has an inverse relationship to said scale factor.

6. In a seismic exploration system having a source of seismic energy, a plurality of receivers for detecting seismic reflection signals, and a recorder for amplifying and converting each seismic reflection signal to a plurality of digital samples, the improvement comprising:
  (a) means for producing a first signal having a plurality of digital bits representing the units of amplification applied to each seismic signal in the recorder,
  (b) means for producing a second signal having a plurality of digital bits representing a desired scale factor to be applied to each seismic signal,
  (c) means for producing a third signal having a plurality of digital bits indentifying the combined count represented by the digital bits of said first and second signals, and
  (d) means for shifting the digital samples for each seismic signal the number of bit positions represented by said third signal.

7. The system of claim 6 further including means for stacking corresponding digital samples for a plurality of said seismic signals to produce a composite record.

8. The system of claim 6 wherein the number of said digital samples being stacked has an inverse relationship to said scale factor.

9. The system of claim 7 further including means for shifting the digital samples of said composite record the number of bit positions necessary to impart a desired gain to said composite record prior to recording.